United States Patent
Waibel et al.

(10) Patent No.: US 8,969,426 B2
(45) Date of Patent: Mar. 3, 2015

(54) METHOD FOR THE PREPARATION OF HIGHLY PURIFIED RECYCLED NYLON

(71) Applicants: Brian J. Waibel, Kennett Square, PA (US); David J. Lawrence, Newark, DE (US)

(72) Inventors: Brian J. Waibel, Kennett Square, PA (US); David J. Lawrence, Newark, DE (US)

(73) Assignee: Dynasep Inc., Wilmington, DE (US)

( * ) Notice: Subject to any disclaimer, the term of this patent is extended or adjusted under 35 U.S.C. 154(b) by 0 days.

(21) Appl. No.: 13/802,124

(22) Filed: Mar. 13, 2013

(65) Prior Publication Data

US 2013/0296525 A1    Nov. 7, 2013

Related U.S. Application Data

(60) Provisional application No. 61/641,840, filed on May 2, 2010.

(51) Int. Cl.
   *C08J 11/04*    (2006.01)
   *B01D 17/02*    (2006.01)
   *C08J 11/08*    (2006.01)

(52) U.S. Cl.
   CPC ............... *B01D 17/02* (2013.01); *C08J 11/04* (2013.01); *C08J 11/08* (2013.01); *C08J 2377/04* (2013.01)
   USPC ........... 521/49.8; 521/40; 521/40.5; 528/332; 528/335; 528/367; 209/17; 209/18; 210/633; 210/710; 210/711; 210/712; 210/713

(58) Field of Classification Search
   CPC .......... B01D 17/02; C08J 11/04; C08J 11/06; C08J 11/08; C08J 2377/02; C08J 2377/04; C08J 2377/06; C08J 2377/10
   USPC .......... 521/40, 40.5, 49.8; 528/332, 335, 367; 209/17, 18; 210/633, 710–713
   See application file for complete search history.

(56) References Cited

U.S. PATENT DOCUMENTS

| | | | |
|---|---|---|---|
| 3,113,838 A | 12/1963 | Perri et al. | |
| 5,233,021 A | 8/1993 | Sikorski | |
| 5,430,068 A | 7/1995 | Subramanian | |
| 5,849,804 A | 12/1998 | Sarian et al. | |
| 5,876,505 A | 3/1999 | Klyosov et al. | |
| 5,889,142 A | 3/1999 | Mohajer et al. | |
| 6,051,196 A | 4/2000 | Singh et al. | |
| 6,379,489 B1 | 4/2002 | Goulet et al. | |
| 6,699,708 B1 | 3/2004 | Muller et al. | |
| 7,152,742 B2 * | 12/2006 | Donaj et al. | 209/176 |
| 7,784,719 B1 | 8/2010 | Wingard | |
| 8,071,656 B2 | 12/2011 | Waibel et al. | |
| 2002/0129889 A1 | 9/2002 | Anderson et al. | |
| 2008/0264585 A1 | 10/2008 | Leino et al. | |
| 2009/0300982 A1 | 12/2009 | Mauldin et al. | |
| 2010/0044480 A1 | 2/2010 | Lindsey et al. | |
| 2010/0228000 A1 * | 9/2010 | Waibel et al. | 528/310 |
| 2011/0011544 A1 | 1/2011 | Gerber et al. | |

FOREIGN PATENT DOCUMENTS

| | | |
|---|---|---|
| CN | 101 845 150 A | 9/2010 |
| JP | 2008-106183 A | 5/2008 |
| WO | WO 00/29463 | 5/2000 |
| WO | WO 2010/129945 | 11/2010 |
| WO | WO 2011/088437 | 7/2011 |
| WO | WO 2013/165755 | 11/2013 |

OTHER PUBLICATIONS

PCT International Search Report and Written Opinion dated Jun. 7, 2013 issued in PCT/US2013/037831.
PCT International Preliminary Report on Patentability dated Nov. 13, 2014 issued in PCT/US2013/037831.
Harrison, D.J., (1993) "Industrial Minerals Laboratory Manual LIMESTONE," Technical Report WG/92/29, *Mineralogy and Petrology Series, British Geological Survey*, NERC, 54 pages.

* cited by examiner

*Primary Examiner* — Frances Tischler
(74) *Attorney, Agent, or Firm* — Weaver Austin Villeneuve & Sampson LLP

(57) ABSTRACT

The present invention relates to the recovery of nylon from co-mingled materials (e.g., carpet) with reduced or eliminated ash (e.g., calcium carbonate) contamination.

15 Claims, No Drawings

METHOD FOR THE PREPARATION OF HIGHLY PURIFIED RECYCLED NYLON

CROSS-REFERENCE TO RELATED APPLICATIONS

This application claims the benefit under 35 U.S.C. 119(e) of U.S. Provisional Application No. 61/641,840, filed on May 2, 2012, which is hereby incorporated herein by reference in its entirety for all purposes.

BACKGROUND OF THE INVENTION

The present invention relates to the recovery of nylon from co-mingled materials (e.g., carpet) with reduced or eliminated ash (e.g., calcium carbonate) contamination.

SUMMARY OF THE INVENTION

In one aspect, the invention provides methods of reducing and/or eliminating ash (e.g., calcium carbonate) contamination in nylon separated from co-mingled material. In some embodiments, the methods comprise:
  a) separating a co-mingled material comprising nylon from free calcium carbonate, yielding a co-mingled material comprising nylon and surface-exposed calcium carbonate;
  b) contacting the co-mingled material comprising nylon and surface-exposed calcium carbonate with an aqueous dilute acid solution thereby forming a water soluble calcium salt, wherein the surface-exposed calcium carbonate dissolves in the aqueous dilute acid solution and the nylon and other materials (e.g., polypropylene and latex) are insoluble in the aqueous dilute acid solution; and
  c) separating the aqueous dilute acid solution comprising the solubilized calcium salt from the insoluble nylon and other materials, thereby reducing and/or eliminating ash contamination from the co-mingled nylon.

In another aspect, the invention provides methods of reducing and/or eliminating ash (e.g., calcium carbonate) contamination in nylon separated from co-mingled material. In some embodiments, the methods comprise:
  a) separating a co-mingled material comprising nylon from free calcium carbonate, yielding a co-mingled material comprising nylon and surface-exposed calcium carbonate;
  b) contacting the co-mingled material comprising nylon and surface-exposed calcium carbonate with an aqueous dilute acid solution thereby forming a water soluble calcium salt, wherein the surface-exposed calcium carbonate dissolves in the aqueous dilute acid solution and the nylon and other materials (e.g., polypropylene and latex) are insoluble in the aqueous dilute acid solution;
  c) separating the aqueous dilute acid solution comprising the solubilized calcium salt from the insoluble nylon and other materials;
  d) dissolving the nylon and other materials in an acid solvent that dissolves nylon, thereby yielding a polymer solution comprised of the dissolved nylon and suspended insoluble constituents;
  e) separating the polymer solution comprising dissolved nylon from the suspending insoluble constituents; and
  f) contacting the polymer solution with a countersolvent that is miscible with the acid solvent and is immiscible with the nylon, wherein the nylon precipitates from the polymer solution, thereby separating nylon with reduced and/or eliminated ash contamination from the other materials.

In some embodiments, the separating step c) comprises mechanical separation. In some embodiments, the separating step c) does not comprise centrifugation. In some embodiments, the separating step c) does not comprise densitometric separation. In some embodiments, the method does not comprise contacting the co-mingled material comprising nylon and surface-exposed calcium carbonate with an aqueous solution comprising a separating salt prior to step b).

In some embodiments, the methods further comprise after step c) washing residual calcium salt from the insoluble nylon and other materials. In various embodiments, the residual calcium salt is washed from the insoluble nylon and other materials with the aqueous dilute acid solution. In various embodiments, the residual calcium salt is washed from the insoluble nylon and other materials with water.

In various embodiments, the aqueous dilute acid solution comprises 10 wt. % or less, e.g., 9 wt. %, 8 wt. %, 7 wt. %, 6 wt. %, 5 wt. %, 4 wt. %, 3 wt. %, 2 wt. %, 1 wt. %, or less, and greater than 0.1 wt % of acid. In various embodiments, the aqueous dilute acid solution comprises a pH in the range of about 1-6, for, example, in the range of about 2-5, for example, a pH of about 1.0, 1.5, 2.0, 2.5, 3.0, 3.5, 4.0, 4.5, 5.0, 5.5, 6.0 or 6.5.

In some embodiments, the water soluble calcium salt forming acid forms a calcium salt having at least 0.5 g/L solubility in water. In some embodiments, the water soluble calcium salt forming acid is selected from the group consisting of formic acid, acetic acid, hydrochloric acid, nitric acid, bromic acid, chromic acid, perchloric acid, benzoic acid, iodic acid, and mixtures thereof. In some embodiments, the water soluble calcium salt forming acid does not comprise sulfuric acid, phosphoric acid, and/or hydrofluoric acid.

In various embodiments, the acid solvent that dissolves nylon comprises an acid selected from the group consisting of formic acid, sulfuric acid, phosphoric acid, hydrochloric acid, acetic acid, nitric acid, and mixtures thereof. In some embodiments, the acid solvent that dissolves nylon comprises a lower aliphatic carboxylic acid. In various embodiments, the lower aliphatic carboxylic acid is selected from the group consisting of formic acid, acetic acid, propiolic acid, acrylic acid, propionic acid, isocrotonic acid, butyric acid, isobutyric acid, valeric acid, caproic acid, enanthic acid, caprylic acid, and mixtures thereof. In various embodiments, the lower aliphatic carboxylic acid is formic acid. In various embodiments, the acid solvent comprises the acid at a concentration of at least about 85 wt %. In some embodiments, the acid solvent that dissolves nylon comprises at least 85 wt % formic acid.

In some embodiments, the method is performed at ambient temperature. For example, the method can be performed at a temperature in the range of about 20° C. to about 40° C., for example, in the range of about 25-35° C., for example, about 25° C., 26° C., 27° C., 28° C., 29° C., 30° C., 31° C., 32° C., 33° C., 34° C. or 35° C.

In some embodiments, the separating step d) comprises filtering the suspended insoluble constituents from the dissolved nylon.

In some embodiments, the countersolvent is selected from the group consisting of dimethyl ether (DME), water and acetone. In some embodiments, the countersolvent is dimethyl ether (DME).

In some embodiments, the nylon contacted with the solvent is at a concentration of about 25% or less, for example, in the range of about 2% to about 25%, or about 5-20%, or about 5-15%, for example, about 5%, 10%, 15%, 20%, or 25%.

In some embodiments, the nylon can be nylon 6 or nylon 6/6. In some embodiments, the nylon is selected from the group consisting of nylon 6, nylon 6,6, nylon 8, nylon 10, nylon 11, nylon 6,10, polyhexamethylene adipamide, polyamide-4,6, polyamide-12, and mixtures thereof.

In some embodiments, the nylon in the feedstock is less than 50% pure, e.g., about 30%-50% pure. In some embodiments, the nylon in the feedstock is greater than 50% pure, e.g., at least about 80% or 90% pure. In some embodiments, the polyamide in the feedstock material is in carpet.

In some embodiments, the nylon precipitated from the second solution is comprised of particles having an average diameter of at least about 50 µm, for example, at least about 60 µm, 70 µm, 80 µm, 90 µm or 100 µm, for example, in the range of about 50-300 µm or about 50-200 µm.

In some embodiments, the nylon precipitated from the second solution is in the form of free-flowing particles.

In some embodiments, the nylon precipitated from the acid solvent in the presence of countersolvent is at least 90%, for example, at least about 91%, 92%, 93%, 94%, 95%, 96%, 97%, 98%, 99% purified from the other material, e.g., in comparison to the feedstock material or by evaluating the purified polymer particles themselves.

In some embodiments, the nylon recovered contains less than 0.5% ash.

Definitions

"Surface-exposed calcium carbonate" refers to calcium carbonate available to be solubilized in a dilute acid aqueous solution, e.g., that is not completely encapsulated in styrene-butadiene rubber (SBR).

A "dilute acid aqueous solution" refers to an aqueous acid solution having an acid concentration that is insufficient to dissolve a significant quantity of nylon, polypropylene (PP), or latex styrene-butadiene rubber (SBR).

The term "lower alkyl carboxylic acid" refers to carboxylic acids having from 1 to 8 carbon atoms, for example, from 1 to 6, 1 to 5, 1 to 4 or 1 to 3 carbon atoms. The carboxylic acid can be straight chain or branched, and can be an alkane, alkene or alkyne. The carboxylic acid can be a monocarboxylic acid or a dicarboxylic acid. Lower alkyl carboxylic acids that find use have a pKa in the range of about 3.0 to about 5.0, for example, about 3.5-4.0. Exemplary lower alkyl aliphatic monocarboxylic acids include formic acid, acetic acid, propiolic acid (i.e., 2-propynoic acid), acrylic acid (i.e., 2-propenoic acid), propionic acid (i.e., propanoic acid), isocrotonic acid (i.e., cis-2-butenoic acid), butyric acid (i.e., butanoic acid), isobutyric acid (i.e., 2-methylpropanoic acid), valeric acid (i.e., pentanoic acid), caproic acid (i.e., hexanoic acid), enanthic acid (i.e., heptanoic acid), caprylic acid (i.e., octanoic acid), and mixtures thereof.

As used herein, the terms "commingled materials" or "other materials" interchangeably refer to materials other than the nylon being extracted. For example, in carpet, the nylon is oftentimes commingled with other polymers, including polyolefin (e.g., polypropylene and/or polyethylene) and polyester polymers, as well as other materials, including latex, calcium carbonate, glues, etc.

The terms "selectively dissolves" or "preferentially dissolves" interchangeably refer to a solvent that is relatively more soluble with, and therefore dissolves, a nylon in comparison to other materials co-mingled with the nylon. Other materials can include other polymers, e.g., polyolefins (e.g., polypropylene and polyethylene) and polyesters, latex, calcium carbonate, glues, etc. In some embodiments, a solvent that selectively or preferentially dissolves a nylon is not soluble with, and therefore does not dissolve or substantially does not dissolve, the other materials commingled with the nylon. In some embodiments, less than 10%, for example, less than 9%, 8%, 7%, 6%, 5%, 4%, 3%, 2% or 1%, of the dissolved materials are a material other than a nylon. In some embodiments, the solvent that selectively or preferentially dissolves a nylon dissolves at least about 10-fold more, e.g., about 20-fold, 50-fold or 100-fold more, nylon in comparison to its capability to dissolve the other material commingled with the nylon. Assays for determining the amount of nylon dissolved in the solvent are known in the art. At 25° C., about 1.5 wt % to about 17 wt %, for example, about 10 wt % to about 15 wt % nylon is dissolved in the solvent. The concentration of dissolved nylon can be increased at higher temperatures. In contrast, less than about 10 parts per million (ppm) of the other contaminating materials are dissolved in the solvent.

As used herein, "ash" refers to the matter that remains after a mixture of solids is exposed to a temperature in excess of 600° C. for a period of at least an hour. This temperature causes all organic matter to be converted to vapor products and retains the inorganic material.

DETAILED DESCRIPTION

1. Introduction

The present invention is based, in part, on the recovery of highly purified nylon that is relatively free of secondary impurities. In various embodiments of practicing the method, a size-reduction process treats post-consumer and/or post-industrial nylon carpet. The size-reduced carpet may be in the wet state or the dry state. The assembly is decomposed into constituents comprised of nylon, polypropylene (PP), latex backing, and calcium carbonate. The latex backing is comprised of latex styrene-butadiene rubber (SBR) and calcium carbonate. The present methods relate to the removal of the calcium carbonate (e.g., $CaCO_3$) from the mixture so that the calcium carbonate is not later converted to a calcium salt that is soluble in the acid solvent for dissolving the nylon. Calcium carbonate exists in the solid mixture in three different forms: $CaCO_3$ that is otherwise not adhered to the other carpet constituents (e.g., free $CaCO_3$), $CaCO_3$ that is partially enveloped by SBR, and $CaCO_3$ that is completely encapsulated by SBR (embedded $CaCO_3$). Placing the nylon in aqueous dilute acid solution results in a form of $CaCO_3$ that is completely encapsulated in SBR, an insoluble particle in the nylon/acid solution (nylon dissolved in acid solvent, described below). Insoluble particles of SBR-encapsulated calcium carbonate can be separated from the nylon/acid solution, thereby removing the encapsulated form of $CaCO_3$.

The invention is based, in part, on the recognition that $CaCO_3$ reacts with dilute acid aqueous solutions to form a calcium salt and carbon dioxide ($CO_2$). Suitable acids include acids that form water soluble calcium salts, e.g., calcium salts having a solubility in water at 20° C. of at least about 0.5 g/L. Illustrative acids include without limitation, e.g., formic, acetic, hydrochloric, nitric, bromic, chromic, perchloric, benzoic, iodic acid, and mixtures thereof. The $CO_2$ is released as a gas. By placing the solid matrix (containing, e.g., nylon, PP, SBR, and $CaCO_3$) in water and adding the dilute acid, the $CaCO_3$ converts to the water soluble salt. As used herein, a dilute acid refers to an aqueous solution having an acid concentration that is insufficient to dissolve a significant quantity of nylon, PP and/or SBR. Additional fresh water can be added to the aqueous mixture to dilute the solution. Also, water washing in a leaching process is known to those in the art. In preforming the present methods, the water solubilized calcium salt is removed from the balance of the solid mixture. In cases where the SBR may completely envelope pockets of CaCO₃, the CaCO₃ encapsulated within the SBR covering may not be accessible to reaction with the dilute acid and, therefore, may remain encapsulated within solid latex.

2. Separating Co-Mingled Material Comprising Nylon from Free Calcium Carbonate

To reduce the amount of acid required, separation techniques may be used in some embodiments to first remove free CaCO₃ prior to dissolving remaining surface-exposed CaCO₃ to aqueous dilute acid solution. Any appropriate separation technique known in the art can be used. In various embodiments, free calcium carbonate is separated from the co-mingled materials using mechanical separation methods. In various embodiments, the mechanical separation may use sifting (i.e. size exclusion) or gravimetric separation (air or liquid floatation). The CaCO₃ has a small particle size relative to the other solid constituents and a specific gravity of 2.2 enabling it to be readily separated from the nylon, polypropylene, and latex, all of which have a specific gravity of approximately 1.0. The treatment to remove free CaCO₃ could be done in either the wet state (i.e. a suspension of solids in water) or dry state.

In various embodiments, the co-mingled material comprising nylon is delivered as feedstock and dissolved in the solvent is commingled with other contaminating materials, e.g., other polymers, including polyolefins (e.g., polypropylene and polyethylene) and polyesters, latex, calcium carbonate, glues, etc. For example, polypropylene is present in the primary and secondary backing of most carpets, generally in the form of woven ribbons or nonwoven fabric. In addition, polypropylene fiber is sometimes found as the face fiber. Backing compositions generally contain binders such as SBR latex and fillers such as calcium carbonate. Commercial carpet may employ mixed polyolefin, polyvinyl chloride, or polyurethane non-fibrous backing components. A typical carpet composition may be about 47 wt % nylon (either nylon 6 or nylon 6/6), 16 wt % polypropylene (PP), 24 wt % calcium carbonate (CaCO₃), and 13 wt % latex. The PP, CaCO₃, and latex are carpet backing material and are insoluble (i.e., do not dissolve) in formic acid.

The fiber component of the overall post-consumer carpet waste stream contains approximately 40% nylon 6; 40% nylon 6,6; and 10% polypropylene. Sorting carpet pieces according to face fiber type before the pieces are shredded, further size-reduced, and separated into a fibrous component and a non-fibrous binder and dirt component, can yield segregated commingled fiber wastes composed of about 80% nylon 6 or nylon 6,6 and about 5% to 10% polypropylene. This amount of polypropylene polymer in polyamide degrades the physical properties of the nylon to such an extent that it is unsuitable for virtually all typical nylon 6 or nylon 6,6 applications. Thus, the utility of nylon 6 and nylon 6,6 polymers recovered from waste is, to a great extent, dependent upon the absence of polyolefin polymer contaminants. In some embodiments, the co-mingled feedstock material contacted with the solvent usually contains in the range of about 30-50% nylon.

In various embodiments, the concentration of the nylon dissolved in the solvent is about 25% or less, for example in the range of about 2-25% nylon. In some embodiments, the nylon dissolved in the solvent is at a concentration of about 5-20% or 5 15%, for example, about 5%, 10%, 15%, 20% or 25% nylon.

In some embodiments, the feedstock material is nylon-containing carpet. The carpet is broken down into manageable-sized pieces using methods known in the art, e.g., is subject to mechanical shredding or the face fibers are shaved from the backing and isolated, before being immersed in the solvent. In some cases, the components of the carpet, i.e., the backing and the fibers, are separated before processing. Procedures and processes for preparing carpet for recycling and nylon extraction are well known and described, for example, in U.S. Pat. Nos. 5,518,188; 5,535,945; 5,840,773; 5,859,071; 5,898,063; 6,241,168; 6,752,336; and 7,067,613.

Briefly, carpet feedstock can be in rolls or otherwise oversized scraps. The carpet feedstock can be subjected to mechanical size-reduction processes to break down the carpet into its fibrous components (i.e., face fibers and olefin backing fibers). Size reduction can be effected by first shredding (e.g., ripping in a shredder) and thereafter granulating the carpet feedstock. Carpet size-reduction, can be carried out as a dry process, and can be performed as either a batch or continuous process.

Carpet shredding can be achieved using conventional shredding equipment. The subsequent granulating of the shredded carpet can be achieved by subjecting the carpet pieces to a rotating blade classifier, e.g., characterized by rotating knives that integrate with stationary bed knives. Other means to disintegrate the carpet waste into fibrous components and such means also find use. See, e.g., Green and Perry, Perry's Chemical Engineers' Handbook, 8th Edition, 2008, McGraw-Hill.

The carpet feedstock usually includes substantially more face fiber than olefin fabric backing, for example, about 90 weight percent face fibers and about ten weight percent olefin fabric backing Those having ordinary skill in the art will appreciate that olefin backing fabrics tend to granulate differently than face fibers. In particular, the size-reduced olefin backing fibers are generally longer and coarser than the size-reduced face fibers. Consequently, the size-reduced fiber may be adequately characterized by describing the face fiber fraction.

In some embodiments, carpet material in the size range of about 0.25 to about 0.5-1.0 inch average diameter is introduced into a tank containing the solvent. In some embodiments, the mean length of the size-reduced face fibers is less than about 15 mm, for example, less than about 10 mm, for example, between about 3 mm and 7 mm (e.g., about 5 mm). Optionally, fibers of a desired length can be selected and/or sorted by subjecting the face fibers to filters or screens.

3. Contacting the Co-Mingled Material Comprising Nylon and Calcium Carbonate with an Aqueous Dilute Acid Solution After removal and/or reduction of free calcium carbonate, a slurry of solid constituents is created and contacted with an aqueous dilute acid solution. In various embodiments, the slurry of solid constituents (e.g., nylon, polypropylene, latex SBR, etc.) is submerged in the aqueous dilute acid solution. The slurry can be subject to mechanical agitation, stirring or shaking as necessary to facilitate solubilization of the calcium salt. This operation can nominally be completed at room temperature. The dissolution of the calcium salt within the water has kinetics of less than a second.

The aqueous dilute acid solution contains a sufficient concentration of acid and has a sufficiently low pH to dissolve or solubilize surface-exposed calcium carbonate, thereby forming a solution comprising water soluble calcium salt. The aqueous dilute acid solution is not of a sufficient concentration and/or sufficiently low pH to significantly dissolve or solubilize nylon, polypropylene or latex SBR.

Illustrative acids that produce calcium salts having a solubility in water that is at least 0.5 g/L include, e.g., formic acid, acetic acid, hydrochloric acid, nitric acid, bromic acid, chromic acid, perchloric acid, benzoic acid, iodic acid, and mixtures thereof. Acids unsuitable for use in the aqueous dilute acid solutions because they form salts with a solubility in water at 20° C. of less than 0.5 g/L include, e.g., sulfuric acid, phosphoric acid, and/or hydrofluoric acid. In various embodiments, the aqueous dilute acid solution comprises formic acid. In various embodiments, the aqueous dilute acid solutions comprise acid in a concentration range of about 0.1-10 wt %, for example, in a concentration range of about 0.1-9 wt %, 0.1-8 wt %, 0.1-7.0 wt %, 0.1-6 wt %, 0.1-5 wt %, 0.1-4 wt %, 0.1-3 wt %, 0.1-2 wt %, 0.1-1 wt %. In various embodiments, the aqueous dilute acid solution comprises 0.1-10 wt % formic acid.

TABLE 1

| Acid | Salt Name | Salt Formula | Water Solubility at 20° C. (g/L) |
|---|---|---|---|
| Formic | Calcium formate | $Ca(HCO_2)_2$ | 16.6 |
| Acetic | Calcium acetate | $Ca(C_2H_3O_2)_2$ | 34.7 |
| Hydrochloric | Calcium chloride | $CaCl_2$ | 74.5 |
| Nitric | Calcium nitrate | $Ca(NO_3)_2$ | 84.5 |
| Bromic | Calcium bromate | $CaBr_2$ | 143 |
| Chromic | Calcium chromate | $CaCrO_4$ | 2.25 |
| Perchloric | Calcium perchlorate | $Ca(ClO_4)_2$ | 188 |
| Benzoic | Calcium benzoate | $Ca(C_7H_5O_2)_2$ | 2.72 |
| Iodic | Calcium iodide | $CaI_2$ | 16.6 |

Contacting the co-mingled slurry of solid constituents comprising nylon with the aqueous dilute acid solution results in solubilized calcium salt in the solution and an undissolved suspension of nylon, PP, SBR, and $CaCO_3$ encapsulated by SBR.

4. Separating Aqueous Dilute Acid Solution Comprising Solubilized Calcium Salt from Insoluble Constituents The aqueous dilute acid solution comprising solubilized or dissolved calcium salts is separated from the slurry of insoluble and/or undissolved constituents (e.g., undissolved nylon, polypropylene and SBR) using any method known in the art.

Generally, the undissolved and insoluble solids are separated from the aqueous dilute acid solution comprising solubilized or dissolved calcium salts using passive or mechanical means. For example, the undissolved and/or insoluble solids can be allowed to settle, and the aqueous dilute acid solution comprising solubilized or dissolved calcium salts can be decanted from the top, leaving the precipitated or settled solids. Separation of the undissolved solids can also be facilitated by mechanical means, for example, using a press, a screen or centrifugal force. The aqueous dilute acid solution comprising solubilized or dissolved calcium salts can also be separated from the undissolved and/or insoluble solids using filtration.

In some embodiments, the aqueous dilute acid solution comprising solubilized or dissolved calcium salts is separated from the insoluble and/or undissolved constituents (e.g., undissolved nylon, polypropylene and SBR) by filtration with a vibratory screen. Suitable vibratory screeners are known in the art and commercially available.

Optionally, after separation of the aqueous dilute acid solution comprising solubilized or dissolved calcium salts from the insoluble and/or undissolved constituents (e.g., undissolved nylon, polypropylene and SBR), residual calcium carbonate (solubilized and unsolubilized) can be washed from the insoluble and/or undissolved constituents. One or more washing or rinsing iterations can be performed with fresh water or fresh aqueous dilute acid solution, e.g., not comprising any solubilized or dissolved calcium salts. In various embodiments, the calcium salt can be removed fresh water, e.g., diluting the slurry of solid constituents in aqueous dilute acid solution with fresh water in the range of 1 to 10-fold. In some embodiments, leaching techniques, e.g., as documented in Treybal, Robert E., "Mass-Transfer Operations, 1980, McGraw-Hill Book Company; 3rd edition", are applied. Such leaching techniques can reduce the amount of fresh water to slurry from 0.5 to 5 using multiple stages of extraction.

After dilute acid treatment and subsequent wash removal of the water soluble calcium salt, there is a mixture of solids in a combination of nylon, polypropylene, SBR, and embedded $CaCO_3$.

5. Dissolving the Nylon and Other Materials in an Acid Solvent that Dissolves Nylon The slurry of undissolved and insoluble constituents (e.g., undissolved nylon; insoluble polypropylene and SBR) separated from the solubilized or dissolved calcium salts is dissolved in an acid solvent that dissolves nylon but does not dissolve PP or SBR. Suitable acid examples include without limitation formic acid, sulfuric acid, phosphoric acid, hydrochloric acid, acetic acid, nitric acid, and mixtures thereof. The acid used as the solvent does not need to be the same acid that is used for the pretreatment (e.g., for removal of the surface exposed calcium carbonate).

In various embodiments, the acid solvent can be a lower alkyl aliphatic carboxylic acid, for example, an aliphatic carboxylic acid containing from 1-8 carbons, for example, 1-6, 1-4 or 1-3 carbons, branched or straight, in the form of an alkane, an alkene, or an alkyne. The solvent can be either a monocarboxylic acid or a dicarboxylic acid. Lower alkyl carboxylic acids that find use are liquids or oily liquids at the operating temperatures, e.g., at temperatures less than about 70° C., e.g., at temperatures in the range of about 20-70° C. or 20-40° C., e.g., at ambient temperatures. Lower alkyl carboxylic acids that find use have a pKa in the range of about 3.0 to about 5.0, for example, about 3.5-4.0.

Exemplary lower alkyl aliphatic monocarboxylic acids include formic acid, acetic acid, propiolic acid (i.e., 2-propynoic acid), acrylic acid (i.e., 2-propenoic acid), propionic acid (i.e., propanoic acid), isocrotonic acid (i.e., cis-2-butenoic acid), butyric acid (i.e., butanoic acid), isobutyric acid (i.e., 2-methylpropanoic acid), valeric acid (i.e., pentanoic acid), caproic acid (i.e., hexanoic acid), enanthic acid (i.e., heptanoic acid), caprylic acid (i.e., octanoic acid), and mixtures thereof.

Exemplary lower alkyl aliphatic dicarboxylic acids include oxalic acid, fumaric acid, succinic acid, malonic acid, tartaric acid, citric acid, and mixtures thereof.

In various embodiments, the acid solvent can be delivered in a feed stream at a concentration of at least about 80 wt %, for example, at least about 85 wt %, 88 wt %, 90 wt %, 92 wt %, 94 wt %, 96 wt % or totally anhydrous acid (100 wt %).

In some embodiments, the solvent is formic acid. Formic acid solvent can be delivered in a feed stream at a concentration of at least about 80 wt %, for example, at least about 85 wt %, 88 wt %, 90 wt %, 92 wt %, 94 wt %, 96 wt % or totally anhydrous formic acid (100 wt %). Reagent or commodity grade formic acid, commercially available at 88 wt % formic acid, finds use in the present methods.

The slurry of undissolved and insoluble constituents (e.g., undissolved nylon; insoluble polypropylene and SBR) separated from the solubilized or dissolved calcium salts is contacted with the acid solvent and mixed under conditions sufficient to dissolve the nylon in the solvent. The slurry of undissolved and insoluble constituents (e.g., undissolved nylon; insoluble polypropylene and SBR) separated from the solubilized or dissolved calcium salts and acid solvent can be mixed using any method known in the art, for example, exposing the mixture of nylon and solvent to mechanical agitation, stirring or shaking The agitation, stirring or shaking is sufficient to homogenize the mixture without shearing, breaking down, or otherwise damaging the integrity of the polymer. Suitable mixers are readily commercially available and known in the art.

The nylon can be dissolved in the solvent without the input of heat, i.e., the nylon can dissolve in the solvent at ambient temperature, e.g., at temperatures in the range of about 20-40° C., for example, about 25-35° C. The step of dissolving the nylon in the solvent can also be performed at ambient pressure.

In some embodiments, the nylon is dissolved in the solvent under conditions of mild heat, e.g., with the addition of heat sufficient to dissolve the polymer in the solvent without breaking down or damaging, or otherwise changing the composition of the nylon. In some embodiments, the nylon is dissolved in the solvent at a temperature of about 70° C. or less, for example in the range of about 40-60° C., for example, at a temperature of about 40° C., 50° C., 60° C. or 70° C.

The temperature can be maintained at a single constant temperature, or adjusted to a higher or a lower temperature throughout the mixing process, as desired. For example, the solvent can be heated in the input stream before contacting the nylon, and then allowed to cool to ambient temperature during the mixing and dissolving of the nylon. Heating of the solvent is not required. In some embodiments, the solvent is heated to a temperature sufficient to decrease the time to dissolve the polyamide in solution and to increase the solubility limit of the polyamide in the solvent.

Generally, the solvent is mixed with the feedstock material containing the nylon such that the mixture contains about 25 wt % or less of the nylon, for example in the range of about 2-25 wt %, 5-20 wt %, 5-15 wt % nylon, for example, about 2 wt %, 5 wt %, 10 wt %, 15 wt %, 20 wt % or 25 wt % nylon.

The mixture produces a slurry comprised of the dissolved nylon in the solvent, undissolved nylon, and undissolved contaminating materials.

6. Separating the Polymer Solution Comprising Dissolved Nylon from the Suspending Insoluble Constituents The nylon carpet fibers readily and rapidly dissolve in solvent acid, for example, concentrated formic acid (>87 wt % concentration). This forms a suspension of acid solvent insoluble PP, SBR, and embedded $CaCO_3$. Since there is virtually no $CaCO_3$ on the surface of the SBR, there is a low (less than 0.1 wt %) calcium salt remaining in the nylon/acid solvent solution.

A portion of the calcium carbonate remains embedded in the latex. Wholly embedded $CaCO_3$ does not react with the acid, and can be removed with the insoluble latex SBR.

Undissolved and/or insoluble contaminating materials (e.g., polyolefin polymers, polyester polymers, glue, dirt) can be removed from the polymer solution, containing the dissolved nylon and the solvent, using any method known in the art, including but not limited to, e.g., filtration, decanting centrifuges, basket centrifuges, pusher screen centrifuges, candle filters, belt filters, and filter presses. In various embodiments, the undissolved solids are separated from the polymer solution containing the nylon dissolved in the solvent using passive or mechanical means. For example, the undissolved solids can be allowed to settle, and the dissolved nylon solution can be decanted from the top, leaving the precipitated solids. Separation of the undissolved solids can also be facilitated by mechanical means, for example, using a press or centrifugal force. The dissolved nylon solution can also be separated from the undissolved solids using filtration.

In some embodiments, solution containing the nylon dissolved in the solvent is decanted from the undissolved solids and then passed through a filter before proceeding to the step of precipitation with countersolvent (e.g., DME, water or acetone).

Separation of the polymer solution from the undissolved solids can be performed at ambient temperature and ambient pressure.

Surprisingly, the creation and removal of the calcium salt, combined with washing prior to placing the solid mass in acid solvent solution leads to an ultra-pure nylon/acid solution that can be recovered as a high purity (greater than 99%) nylon via precipitation methods, e.g., such as that documented in U.S. Pat. No. 8,071,656.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A method of reducing and/or eliminating ash contamination in nylon separated from co-mingled materials, comprising the following ordered steps:
    a) separating a co-mingled material comprising nylon from free calcium carbonate, yielding a co-mingled material comprising nylon and surface-exposed calcium carbonate;
    b) contacting the co-mingled material comprising nylon and surface-exposed calcium carbonate with an aqueous dilute acid solution thereby forming a water soluble calcium salt, wherein the surface-exposed calcium carbonate dissolves in the aqueous dilute acid solution and the nylon is insoluble in the aqueous dilute acid solution; and
    c) separating the aqueous dilute acid solution comprising the solubilized calcium salt from the insoluble nylon and other materials, thereby reducing and/or eliminating ash contamination from the co-mingled nylon, wherein the method does not comprise densitometric separation.

2. A method of reducing and/or eliminating ash contamination in nylon separated from co-mingled materials, comprising the following ordered steps:
    a) separating a co-mingled material comprising nylon from free calcium carbonate, yielding a co-mingled material comprising nylon and surface-exposed calcium carbonate;
    b) contacting the co-mingled material comprising nylon and surface-exposed calcium carbonate with an aqueous dilute acid solution thereby forming a water soluble calcium salt, wherein the surface-exposed calcium carbonate dissolves in the aqueous dilute acid solution and the nylon is insoluble in the aqueous dilute acid solution;
    c) separating the aqueous dilute acid solution comprising the solubilized calcium salt from the insoluble nylon and other materials;
    d) dissolving the nylon and other materials in an acid solvent that dissolves nylon, thereby yielding a polymer solution comprised of the dissolved nylon and suspended insoluble constituents;
    e) separating the polymer solution comprising dissolved nylon from the suspending insoluble constituents; and
    f) contacting the polymer solution with a countersolvent that is miscible with the acid solvent and is immiscible with the nylon, wherein the nylon precipitates from the polymer solution, thereby separating nylon with reduced and/or eliminated ash contamination from the other materials, wherein the method does not comprise densitometric separation.

3. The method of claim 1, wherein separating step c) comprises mechanical separation.

4. The method of claim 1, wherein separating step c) does not comprise centrifugation.

5. The method of claim 1, wherein the method does not comprise contacting the co-mingled material comprising nylon and surface-exposed calcium carbonate with an aqueous solution comprising a separating salt prior to step b).

6. The method of claim 1, further comprising after step c) washing residual calcium salt from the insoluble nylon and other materials.

7. The method of claim 1, wherein the aqueous dilute acid solution comprises 10 wt. % or less and greater than 0.1 wt % of acid.

8. The method of claim 1, wherein the water soluble calcium salt forming acid is selected from the group consisting of formic, acetic, hydrochloric, nitric, bromic, chromic, perchloric, benzoic, iodic acid, and mixtures thereof.

9. The method of claim 2, wherein the acid solvent that dissolves nylon comprises at least 85 wt % of a lower aliphatic carboxylic acid.

10. The method of claim 2, wherein the acid solvent that dissolves nylon comprises at least 85 wt % formic acid.

11. The method of claim 2, wherein the separating step e) comprises filtering the suspended insoluble constituents from the dissolved nylon.

12. The method of claim 2, wherein the countersolvent is selected from the group consisting of dimethyl ether (DME), water and acetone.

13. The method of claim 1, wherein the nylon recovered contains less than 0.5% ash.

14. The method of claim 1, wherein the nylon recovered is at least about 99% purified.

15. The method of claim 2, wherein the nylon recovered is at least about 99% purified.

* * * * *